United States Patent

[11] 3,544,768

| [72] | Inventor | Louis A. Warner<br>5223 N. Natoma, Chicago, Illinois 60656 |
|---|---|---|
| [21] | Appl. No. | 747,387 |
| [22] | Filed | July 24, 1968 |
| [45] | Patented | Dec. 1, 1970 |

[54] MECHANICAL CONVERSION DEVICE
5 Claims, 4 Drawing Figs.

[52] U.S. Cl. .................................................. 235/88,
 35/74, 35/31
[51] Int. Cl. .................................................. G06c 27/00
 G09b 19/02, G09b 19/00
[50] Field of Search ........................................ 235/78, 88;
 35/31.1, 74; 235/70.1, 70, 84; 116/(Inquired);
 33/1.5, 76(UA), 148(E); 33/(Inquired);
 235/61(NAN), 61(GEN), 61(A), 64.3

[56] References Cited
UNITED STATES PATENTS

| 673,944 | 5/1901 | Doty | 33/148 |
| 1,455,339 | 5/1923 | Keller et al. | 235/84 |
| 2,591,327 | 4/1952 | Witter et al. | 35/31 |
| 3,279,695 | 10/1966 | Krause | 235/78 |
| 3,282,502 | 11/1966 | Cayo | 235/88 |
| 3,323,718 | 6/1967 | Warner | 235/64.3 |
| 3,432,942 | 3/1969 | Jack | 35/31 |

*Primary Examiner*—Richard B. Wilkinson
*Assistant Examiner*—Stanley A. Wal
*Attorney*—Dominik, Knechtel and Godula

ABSTRACT: A conversion device adapted to be easily and automatically set to perform conversions, simply by inserting a pointed object through an appropriate one of a number of indexing apertures in one member and slidably movably adjusting that member relative to another until the pointed object seats within a setting aperture or slot in the second one of the two members. Conversions then are made simply by reference to calibrated scales on the two members.

PATENTED DEC 1 1970

INVENTOR
LOUIS A. WARNER

BY
Dominik, Knechtel & Godula
ATTORNEY

MECHANICAL CONVERSION DEVICE

This invention relates to improved devices for performing mathematical conversions such as, for example, converting fractions, in inches to centimeters, kilometers to statute or nautical miles, and the like.

The most common method of performing conversions is to refer to a table which indicates a conversion factor and then multiply or divide the number to be converted by this conversion factor. For example, to convert inches to centimeters, it can be determined from a conversion table that the number of inches is to be multiplied by 2.54 to convert the same to centimeters.

It is well-known that a slide rule can be used for making these mathematical conversions, simply by, for example, alining the index of the C scale with the graduation on the D scale corresponding to the conversion factor to be used. For example, to convert inches to centimeters, the index of the C scale is alined with the graduation corresponding to the conversion factor of 2.54 on the D scale. Once this is done, the hairline of the cursor is alined with the graduation on the C scale corresponding to the number of inches to be converted to centimeters and the corresponding value, in centimeters, is read on the D scale under the same hairline. Accordingly, this method of performing the conversions is, in essence, no different than that described above except that a slide rule is used rather than a pencil and paper. Furthermore, before this method can be used, the proper conversion factor must be determined. Accordingly, while this latter method is much quicker, it still suffers the disadvantage that the conversion factor must be known before any conversions can be made.

There are several mechanical devices available for performing conversions, which are of a slide rule type construction and which have indicia on them which is related to one or more graduated scales on them. By alining the indicia with the graduated scales in an appropriate fashion, the conversion can be made. Most, if not all, of these devices, however, require resetting of the device each time another conversion is to be made. For example, to convert 7 inches and 8 inches to centimeters, two settings are necessary.

It is an object of the present invention to provide improved devices for performing mathematical conversions.

Another object is to provide improved devices for performing mathematical conversions which are simple in construction and which are easily and quickly used to perform such conversions.

Still another object is to provide improved devices for performing mathematical conversions which are constructed in a fashion such that any two factors can be converted, one to another, after an initial setting is made, without the necessity of resetting the device each time a numerically different factor is to be converted, i.e., for example, any number of inches can be converted to centimeters after an initial setting is made without the necessity of resetting the device each time.

A still further object is to provide improved devices for performing mathematical conversions constructed in a fashion which eliminates the necessity of first determining the conversion factor to be applied. In this respect, it is contemplated that the device include various different indices which can be easily and quickly alined to, for example, convert inches to centimeters, kilometers to statute or nautical miles, or statute miles to nautical miles.

A still further object is to provide improved devices for performing mathematical conversions of the above type which can be of a linear of or a circular slide-rule-like construction.

Still another object is to provide improved devices for performing mathematical conversions of the above type which can be easily and quickly initially set up to perform a conversion by means of a pointed instrument such as a ball-point pen or pencil.

Other objects of the invention will in part be obvious and will in part appear hereinafter.

The above objects are accomplished by means of a conversion device which includes, generally, two members which are disposed one atop the other in a fashion such that they are slidably movably adjustable with respect to one another. Each of these two members has a calibrated scale on it which is operatively related to the scale on the other one of them and which corresponds to the C or D scale formed on most slide rules. One of the two members has a number of indexing apertures in it, each of which is appropriately labeled and corresponds to or represents a particular conversion factor. The other one of the two members has a setting aperture or slot in it which is operatively relate related to these indexing apertures in a fashion such that the conversion device can be easily and quickly automatically set to perform conversions without first determining the particular conversion factor to be used, simply by extending a pointed object such as the point or tip of a ball-point pen through an appropriate one of the indexing apertures and slidably movably adjusting the one member relative to the other until the pointed object seats within the setting aperture or slot. Conversions then are made simply by reference to the calibrated scales on the two members. According to another embodiment, one of the two members has a single indexing aperture in it, and the other member has a number of setting apertures in it which are appropriately labeled and correspond to or represent a particular conversion factor.

The invention accordingly comprises an article of manufacture possessing the features, properties, and the relation of elements which will be exemplified in the article hereinafter described, and the scope of the invention will be indicated in the claims.

For a fuller understanding of the nature and objects of the invention, reference should be had to the following detailed description taken in connection with the accompanying drawings in which.

Similar reference characters refer to similar parts throughout the several views of the drawings.

Figure 1:
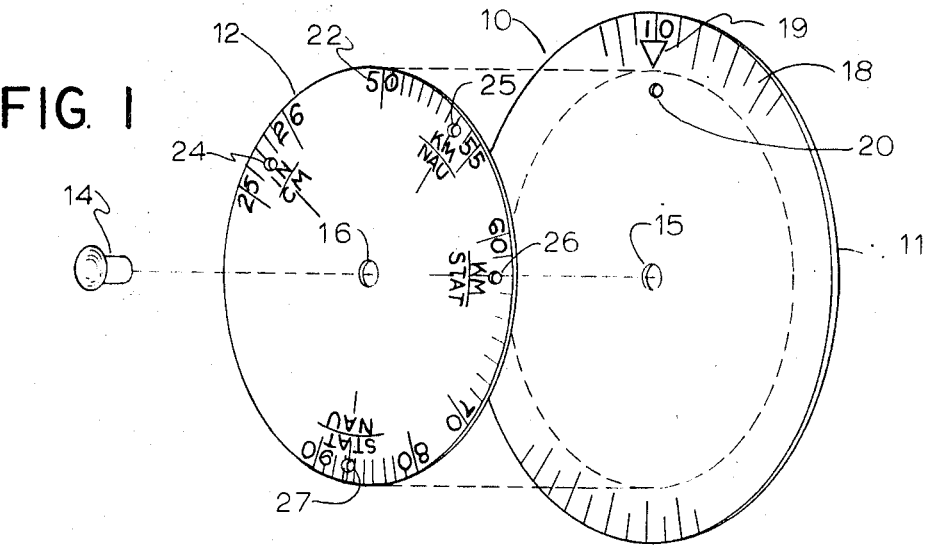
FIG. 1 is an exploded perspective view of a conversion device exemplary of the invention wherein the top member thereof has a number of indexing apertures in it and the bottom member thereof has a single setting aperture.

Referring now to the drawings, in FIG. 1 there is shown a conversion device 10 including a base disk 11 and a top disk 12 which is concentrically and rotatably affixed atop the base disk 11, by means of fastener means such as the studded fastener 14 extended through apertures 15 and 16 formed in the base disk 11 and top disk 12, respectively.

The base disk 11 has a calibrated scale 18 circumferentially provided on it adjacent its peripheral edge, which scale 18 corresponds to the C or D scale provided on an ordinary linear or circular slide rule. The scale 18 has an index 19 and a setting aperture 20 is formed in the base disk 11, in alinement with the index 19. This setting aperture 20 is spaced inwardly from the peripheral edge of the base disk 11 a sufficient distance so that it is concealed by the top disk 12 when the latter is affixed atop the base disk 11.

The top disk 12 has a calibrated scale 22 circumferentially provided on it adjacent its peripheral edge. This scale 22 likewise can be a C or D scale of the type normally provided on an ordinary linear or circular slide rule. Furthermore, as explained more fully below, the calibrated scales 18 and 22 on the base disk 11 and top disk 12 are correspondingly calibrated and are cooperatively positioned with respect to one another in a fashion such as to permit mathematical conversions to be made, in the manner described fully below. The top disk 12 also has a number of indexing apertures 24—27 formed in it, which indexing apertures are spaced from its peripheral edge so that they are each aligned with the setting aperture 20 formed in the base disk 11. Only four indexing apertures are illustrated for the purpose of explaining the structure and operation of the conversion device 10, however, additional indexing apertures can be provided, if desired.

Each of these indexing apertures 24—27 are positioned with respect to the calibrations of the scale 22 in a fashion such as to correspond to a predetermined conversion factor. For example, the indexing aperture 24 is alined with the calibration corresponding to 2.54 of the calibrated scale 22 and is appropriately labeled IN/CM which, of course, is the abbreviation for inches and centimeters, respectively. The indexing aperture 27 is alined with the graduations on the scale 22 corresponding to 86.9 and is appropriately labeled STAT/NAUT which, of course, is the abbreviation for statute and nautical, respectively. Accordingly, the indexing apertures 24 and 27 are used for converting inches to centimeters and statute miles to nautical miles, respectively, while the indexing apertures 25 and 26 each are appropriately labeled and are used to convert kilometers to nautical miles and kilometers to statute miles, respectively.

Figure 4:
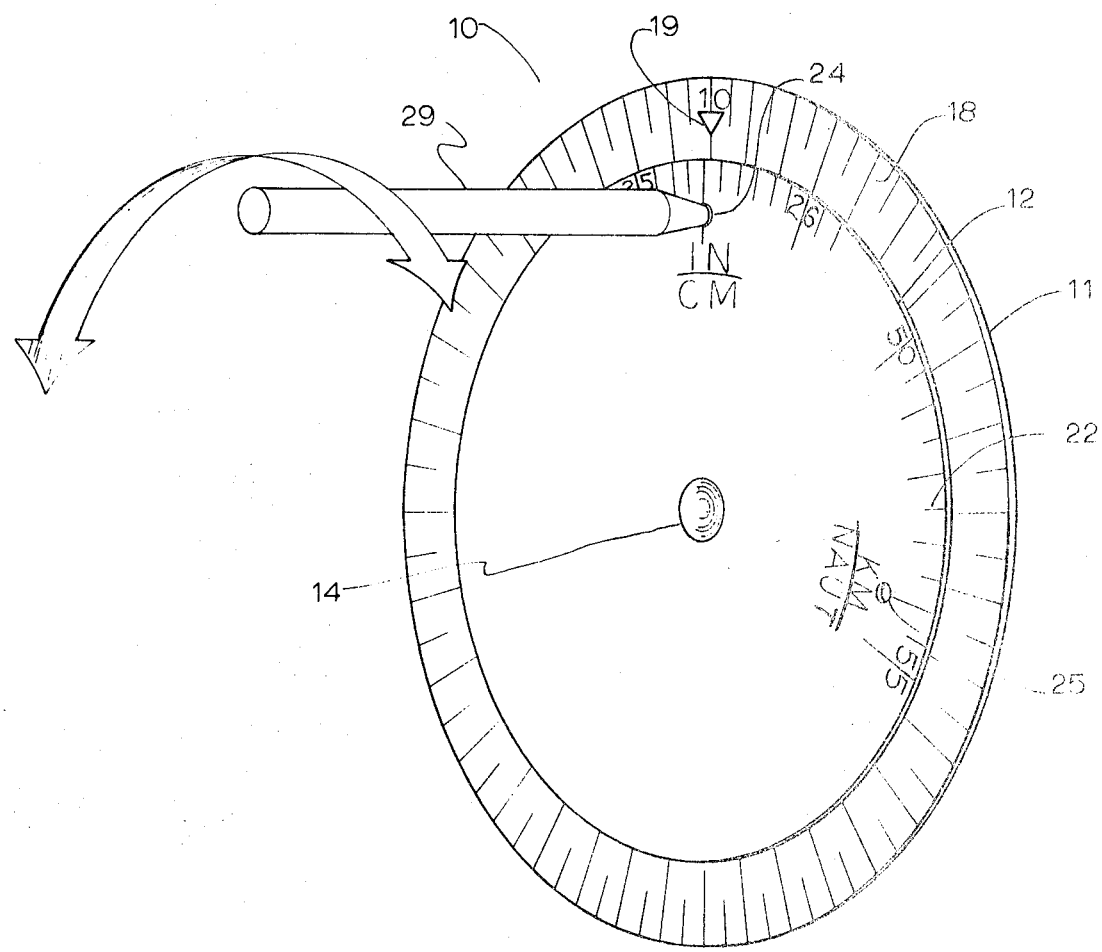
FIG. 4 is a perspective view generally illustrating the manner in which the conversion device is manipulated to initially set the same to perform a conversion.

The manner in which the conversion device 10 is used to make a mathematical conversion is illustrated in FIG. 4. It can there be seen that a pointed object or instrument such as the point or tip of a ball-point pen 29 or the like is inserted in one of the indexing apertures 24—27. In the illustrated case, the tip of the ball-point pen 29 is inserted in the indexing aperture 24, for converting inches to centimeters. After inserting the tip of the ball-point pen 29 into the indexing aperture 24, the top disk 12 is rotatably adjusted in a clockwise or counter-clockwise direction with respect to the base disk 11, until the tip of the ball-point pen 29 seats within the setting aperture 20 (FIG. 1) formed in the base disk 11. Now, any value in inches can be converted to centimeters by locating the value on the scale 18 on the base disk 11 corresponding to the number of inches to be converted to centimeters and then reading the value, in centimeters, on the scale 22 on the top disk 12. If still another different numerical value of inches is to be converted to centimeters, this can be accomplished in the same manner, without the necessity of resetting the conversion device 10. In other words, once the conversion device 10 is indexed or set to convert inches to centimeters, any value in inches can be converted to centimeters without resetting the conversion device. Furthermore, it is not necessary to first determine the conversion factor to be applied to convert inches to centimeters. The party using the conversion device 10 only need insert the point or tip of any pointed object within the indexing aperture 24 appropriately labeled INCHES/CENTIMETERS and rotatably adjusting the top disk 12 with respect to the base disk 11 until the tip of the pointed object seats within the setting aperture 20, to easily and quickly automatically set the conversion device for the indicated type of conversion. Similarly, if it is desired to convert kilometers to nautical miles, the tip of a pointed object is inserted within the indexing aperture 25 and the top disk 12 rotated with respect to the base disk 11, again until the tip of the pointed object seats within the setting aperture 20. At this time, the conversion device is set for converting kilometers to nautical miles and any number of kilometers can be easily and quickly converted to nautical miles simply by locating the appropriate indicia on the scales 18 and 22.

Figure 2:
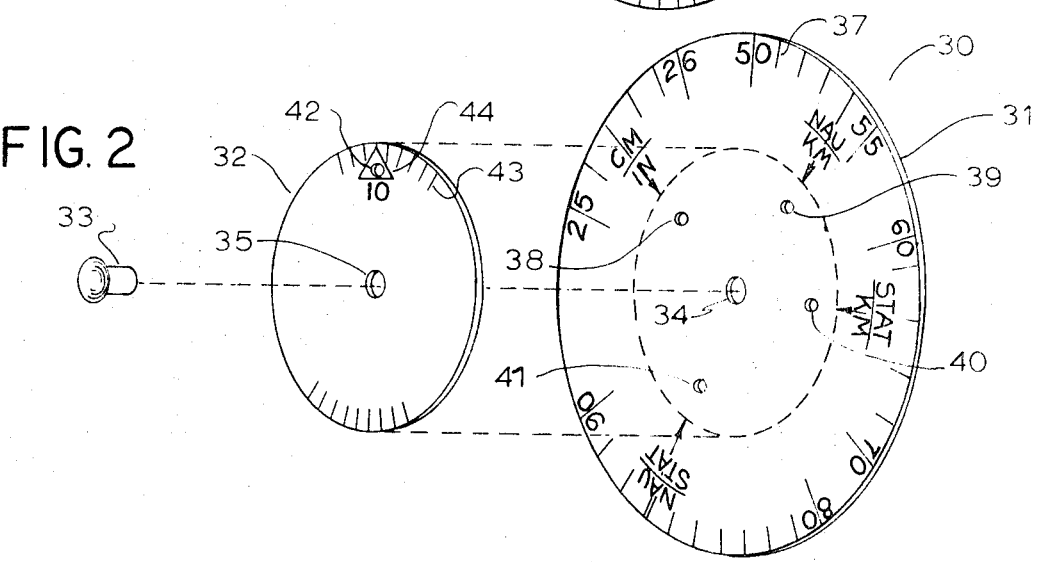
FIG. 2 is an exploded perspective view of another conversion device exemplary of the invention wherein the top member thereof has a single indexing aperture in it and the bottom member thereof has a number of setting apertures in it.

In FIG. 2, there is illustrated another conversion device 30 constructed in accordance with a second embodiment of the invention. In this case, the conversion device 30 has a base disk 31 and a top disk 32 which is rotatably and concentrically affixed atop the base disk 31 by means of fastener means, such as the studded fastener 33. The base disk 31 and the top disk 32 each have calibrated scales 37 and 43 provided on them, respectively, which scales also are C or D scales generally found on an ordinary slide rule.

The principal difference between the conversion device 10 and the conversion device 30 is that in the case of the latter its base disc 31 has a number of setting apertures 38—41 formed in it which setting apertures are positioned and correspond to the indexing apertures 24—27, respectively, formed on the top disk 12 of the conversion device 10. Also, the top disk 32 in this case has a single indexing aperture 42 provided in it, in alinement with the index 44 of the calibrated scale 43 formed on it. Accordingly, it can therefore be seen that, in essence, the roles of the indexing apertures 24—27 and the setting aperture 20 are reversed on the conversion device 30.

The conversion device 30 is used in generally the same manner as the conversion device 10, in that to set the conversion device 30 to perform a particular conversion, the tip of a pointed object is inserted within the indexing aperture 42 in the top disk 32 and the latter rotated with respect to the base disk 31 until the tip of the pointed object drops in one of the setting apertures 38—41 corresponding to the particular type of conversion to be performed. That is, if it is desired to convert from kilometers to nautical miles, the tip of the pointed object is inserted within the indexing aperture 42 and the top disk 32 rotated until the tip of the pointed object seats within the setting aperture 39 in the base disk 31. Thereafter, conversions are performed in the same manner as described above with respect to the conversion device 10, by referring to the scales 37 and 43 on the base disk 31 and the top disk 32, respectively.

While both the conversion devices 10 and 30 are equally efficient in performing conversions in the above-described fashion. the construction of the conversion device 10 is slightly preferable over that of the conversion device 30. This is due to the fact that it is slightly easier to change the conversion factors with the conversion device 10 since the tip of the pointed object used to rotate the top disk 12 with respect to the base disk 11 will not seat within the setting aperture 20 and interfere with the rotation of the top disk 12. For example, if the conversion device 10 is set to convert inches to centimeters, and it is desired to reset the same to convert from statute miles to nautical miles, the tip of the pointed object when inserted within the indexing aperture 27 will engage the top surface of the base disk 11. The top disk 12 therefore can be easily rotated with respect to the base disk 11, until the tip of the pointed object seats within the setting aperture 20. In the case of the conversion device 30, when the tip of the pointed object is inserted within the indexing aperture 42, it may be noted that the tip of the pointed object also will seat within the one of the setting apertures 38—41 corresponding to the position in which the conversion device was last set. In order to freely rotate the top disk 32 with respect to the base disk 31, it may be necessary to rotate the top disk 32 with the thumb until the tip of the pointed object is freed from the setting aperture. This is easily accomplished, hence this slight inconvenience does not overshadow the other advantages of the conversion device 30.

Figure 3:
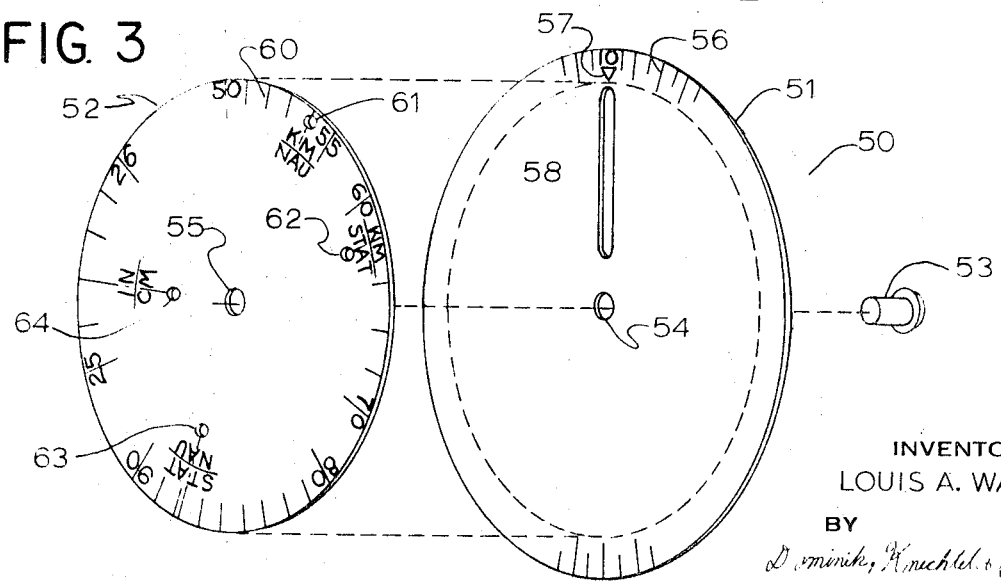
FIG. 3 is an exploded perspective view of a conversion device exemplary of the invention wherein the top member thereof has a number of indexing apertures in it and the bottom member thereof has a single setting slot in it.

In FIG. 3, there is illustrated still another conversion device 50 including a base disk 51 and a top disk 52 which is rotatably and concentrically affixed atop the base disk 51, by means of fastener means such as the studded fastener 53.

The conversion device 50 is substantially like the conversion device 10, however, the setting aperture 20 of the conversion device 10 is replaced by an elongated radially extending setting slot 58. The advantages of using the setting slot 58 is that it permits the position of the indexing apertures 61—64 to be staggered so that each of them is radially positioned a different distance from the center axis of the top disk 52, as illustrated. Also, this arrangement permits numerous additional different conversion factors or indexing apertures to be provided in the top disk 52, so that the value of the conversion device is enhanced because of the greater number of conversions which can be easily and quickly automatically set and performed on it.

Most navigational computers such as the navigational computer disclosed in U.S. Pat. 3,131,858 have a circular sliderule-type computer provided with it. In such cases, it is obvious that these types of computers can be easily modified to provide a conversion device of the above-described type so that numerous ones of the conversion factors which normally have to be performed during the course of a flight in order to determine the solution to a particular air navigational problem can be easily and quickly performed. Accordingly, it is apparent that the disclosed method of constructing a conversion device is not limited to the construction as described, but can be easily and readily adapted to many existing designs. Furthermore, while each of the conversion devices 10, 30 and 50 are of a circular slide-rule-type construction, it is readily apparent that each of these devices could be constructed in the form of a linear slide-rule-type device.

Accordingly, it can be seen from the above description of the conversion devices 10, 30 and 50 that mathematical conversions can be easily and quickly automatically set up and performed. Furthermore, it is not necessary to first determine the particular conversion factor to be applied to a particular problem. It is only necessary to insert the tip of a pointed object within the appropriate one of the indexing apertures formed in the top or bottom disk of the conversion devices. Further still, once the initial setting is made, any number of conversions can be made without the necessity of resetting the device each time a numerically different factor is to be converted.

It will thus be seen that the objects set forth above, among those made apparent from the preceding description, are efficiently attained and, since certain changes may made in the above article without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention, which, as a matter of language, might be said to fall therebetween.

I claim:

1. A conversion device for performing mathematical conversions comprising two members which are disposed atop one another and which are adjustably positionable with respect to one another, a calibrated logarithmic scale on each of said two members at least one indexing aperture in one of said members which is positioned with the logarithmic scale on said one member and which is adapted to receive the tip of a pointed object, at least one setting aperture in the other one of said members positioned to receive the tip of the pointed object when the latter is extended through said indexing aperture and said indexing aperture is alined with said setting aperture, and conversion factor indicia on one of said members associated with an appropriate one of said indexing or setting apertures corresponding to the conversion for which said conversion device is set up to perform when said indexing aperture and said setting aperture are aligned said indexing aperture further being positioned with the scale on said one member so that any numerically different conversions can be made without the necessity of resetting said conversion device.

2. The conversion device of claim 1 wherein said one member has a plurality of indexing apertures provided in it, each of which is positioned with the scale on said one member and which has appropriate conversion factor indicia associated with it corresponding to the conversion for which said conversion device is set up to perform when said setting aperture is alined with respective ones of said plurality of indexing apertures.

3. The conversion device of claim 1, wherein said setting aperture comprises an elongated radially extending slot.

4. The conversion device of claim 2 wherein at least one of said plurality of indexing apertures is spaced at a different radius than the other ones of said plurality of indexing apertures, and wherein said setting aperture comprises an elongated radially extending slot.

5. The conversion device of claim 1, including a plurality of setting apertures in said one member, each of which is positioned with the scale on said one member and which has appropriate conversion factor indicia with it corresponding to the conversion for which said conversion device is set up to perform when said indexing aperture is alined with respective ones of said plurality of setting apertures.